Jan. 3, 1956  H. J. NEIDHART  2,729,442
RESILIENT DEVICES HAVING DEFORMABLE CUSHIONS
Filed July 8, 1955  2 Sheets-Sheet 1
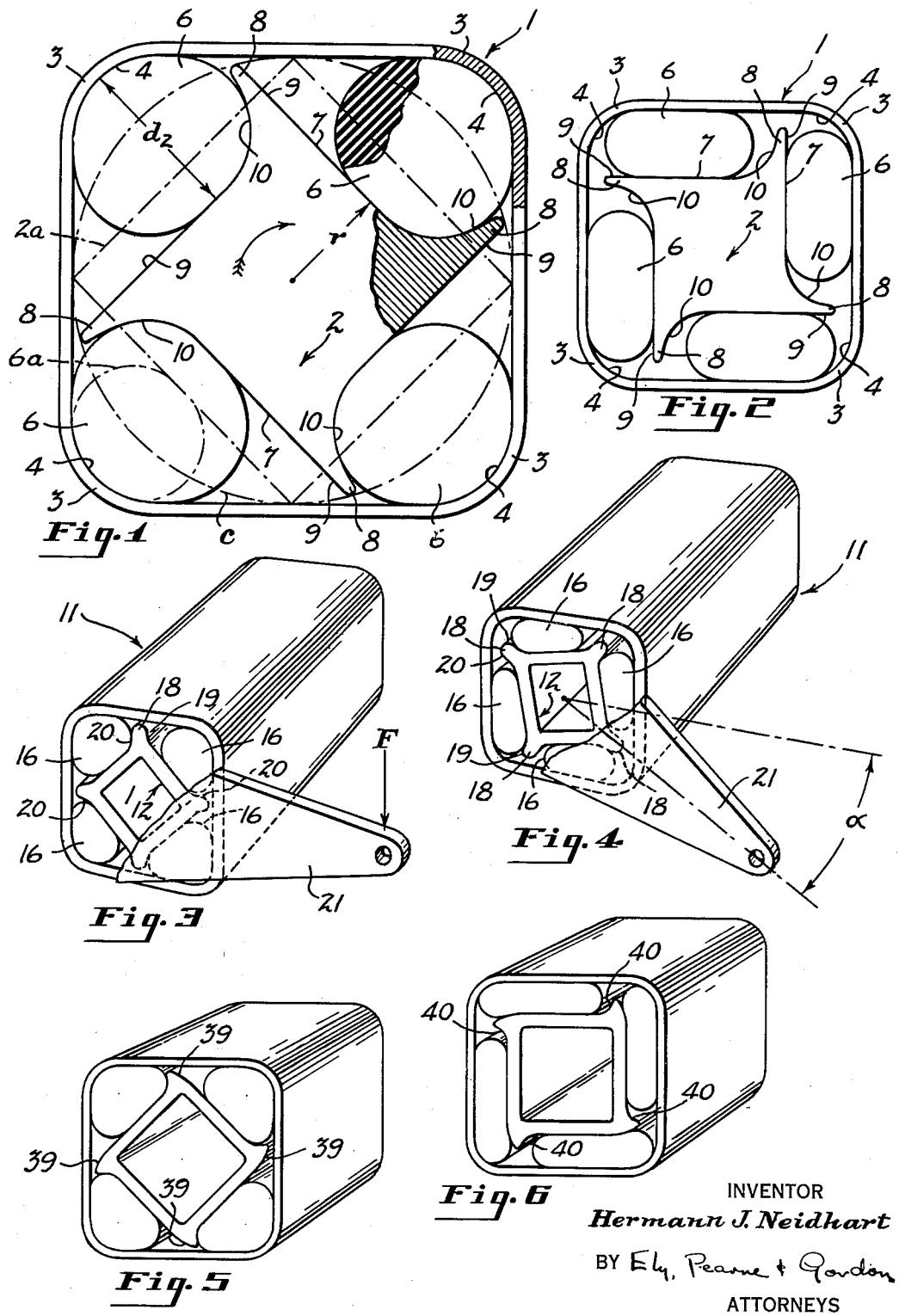
INVENTOR
*Hermann J. Neidhart*
BY Ely, Pearne & Gordon
ATTORNEYS Jan. 3, 1956  H. J. NEIDHART  2,729,442
RESILIENT DEVICES HAVING DEFORMABLE CUSHIONS
Filed July 8, 1955  2 Sheets-Sheet 2

INVENTOR
*Hermann J. Neidhart*
BY Ely, Pearne & Gordon
ATTORNEYS

2,729,442
RESILIENT DEVICES HAVING DEFORMABLE CUSHIONS

Hermann J. Neidhart, Geneva, Switzerland

Application July 8, 1955, Serial No. 520,889

13 Claims. (Cl. 267—21)

This invention relates to improvements in elastic joints employing elastic cushioning elements disposed between relatively rotatable members for yieldingly resisting such rotation. More particularly, the invention relates to such elastic joints wherein one of the relatively rotatable members surrounds the other concentrically with respect to a common axis of relative rotation, the elastic cushioning elements being disposed inside the outer member, and about the inner member.

A number of attempts have previously been made to devise joints of the general character described in which relative rotation of the inner member is resisted entirely by elastic elements, such as rubber, either by placing the elastic elements in shear, in compression, or both. However, insofar as I am aware, all of the prior attempts have met with indifferent and greatly restricted commercial acceptance, or have proved to be of no practical value at all.

One of the principal defects of most of the prior art devices of this general character is the small permissible range of relative movement of the inner and outer members between their unloaded and fully loaded conditions. Efforts to achieve a wider range of relative movement were generally obtainable only at the expense of the load resisting capacity or the durability of the joint, or both. Also, most of the prior art devices had undesirable load-deflection characteristics which could not be greatly altered to suit the requirements of particular commercial applications. In some instances, the shapes of the inner and outer members rendered their fabrication so expensive as to preclude any wide commercial acceptance.

In my prior copending application, Serial No. 232,306, filed June 19, 1951, for Elastic Joints, Patent No. 2,712,742 granted July 12, 1955, of which the present application is a continuation-in-part, I have disclosed and claimed a number of forms of joints, of the general character described above. Those joints permit relative rotary movement of the connected members through a substantial angle while subjecting the elastic cushioning elements substantially only to compressive stresses. The joints of that prior application have many special attributes, as disclosed therein, including simplicity of design and adaptability to a wide variety of commercial uses with little or no variation in the component parts, economy of manufacture, consistency and predictability in operating characteristics, durability under severe service conditions, and suitability for production with a wide range of different load-deflection characteristics. A characteristic feature of the joints of my prior application is that the interior cross section of the outer member and the exterior cross section of the inner member substantially conform to similar, regular polygons. The cushioning elements, preferably in the form of circular cylinders, are each nested between and engaged by a pair of adjacent, intersecting, inner sides of the outer member and one outer side of the inner member when no load is applied to the joints. When the joints are loaded to cause relative rotation of the inner and outer members about their common axis of rotation, a rolling action is imparted to the cushioning elements as they are compressed between flat surfaces of the inner and outer members, which surfaces approach a parallel relationship at the point of theoretical maximum loading. Thus, each cushioning element rolls with no appreciable friction along both of the opposed flat surfaces between which it is compressed under load.

The present application is directed to improvements in flexible joints of the character disclosed and claimed in my prior application referred to above. Such improvements involve the same basic elements in the same relationship, and retain substantially the same mode of operation, as the joints of the prior application.

With the joints of my prior application, relative angular rotation of the inner and outer members should be limited, in practice, to about 80% of the half center angle subtended by one side of one of the polygons. Thus, with square polygons, the normal limit of rotation is about 80% of 90°/2, or about 35°. With hexagonal polygons, the half center angle is 30°, and the normal limit of rotation is about 25°. Rotation beyond these empirical limits is harmful if frequently repeated because the edges of the inner member tend to gouge and destroy the cushioning elements.

The torque or load resisting capacity of a device of this character within the permissible angle of rotation depends upon the amount of rubber or other cushioning material that can be placed between the inner and outer rotatable elements, i. e., the diameter of the cushioning elements employed. In order to increase this torque resisting capacity without increasing the internal dimensions of the outer member, either a stiffer cushioning material must be employed or some modification of the structure must be resorted to whereby the diameter of the cushioning elements may be increased. Within limits, this latter result may be accomplished by making the devices longer or by making the cushioning elements oversize and subjecting them to a greater degree of precompression when inserting them into the device in its no-load condition, as disclosed in my above mentioned prior application. However, lengthening the devices is generally undesirable, and increasing the precompression of the rollers tends to further reduce the angle of rotation at which the edges of the inner member will tend to gouge and destroy the cushioning elements, thus reducing the empirical limit on such rotation.

With the devices of my above mentioned prior application, the outer cross-sectional dimensions of the inner member are preferably made as large as possible relative to the inner cross-sectional dimensions of the outer member, while providing the necessary clearance therebetween. Relative reduction in the cross-sectional size of the inner member permits the use of cushioning elements of greater diameter, but it also reduces the angle of rotation at which gouging of the cushioning elements will occur and increases the possibility that an overload will cause rotation beyond the dead center position, in which case the parts will continue to rotate in the same direction and will not return to their original no-load positions. For want of a better term, this undesired result is called "rolling over," and the cushioning elements may be said to have rolled over the edges of the inner member.

The principal object of the present invention is to modify the devices of the type described so as to increase both the empirical limit upon the safe angle of relative rotation of the inner and outer members and the torque resisting capacity of such devices, without increasing their over-all size.

A more specific object of the invention is to provide for the use of larger diameter cushioning elements, in devices of the type described, for increasing their torque resistance, and at the same time, to increase, rather than decrease, the safe angle of rotation in normal use of such devices.

Still another object of the invention is to accomplish the foregoing objectives with a structure for the inner member which can be made in various shapes to prevent any variation or to provide desired changes in the rate of increase in torque required to produce each additional increment of rotation of the inner member relative to the outer member.

A further object of the invention is to accomplish the foregoing objectives without otherwise materially altering the basic character or mode of operation of the devices, or increasing any of their over-all dimensions, or incurring any of the objections inherent in the other modifications of such devices discussed above.

Certain of the foregoing objectives are accomplished in accordance with the invention by reducing the outer cross-sectional dimensions of the inner polygonal member relative to the outer polygonal member, and, at the same time, extending each cushion engaging face of the inner member in the same peripheral direction, relative to the axis of rotation, so that it projects generally tangentially beyond the reduced polygonal outline in the form of a longitudinally extending fin or rib. This enlarges the spaces for the cushioning elements under no-load conditions while extending, rather than shortening, the effective rolling surfaces of the inner member for resisting torques applied in one direction. Such devices, of course, are not reversible and are intended to yield to the normal maximum degree in one direction only.

The remaining objectives are accomplished by modifying the shape of the sides of the inner member so that its roller engaging surfaces are curved, as viewed in a sectional plane transverse to the axis of rotation. As hereinafter shown and described in detail, the curves may have a variety of forms to produce a substantially constant or any desired variation in torque required to produce each additional increment of rotation of the inner member relative to the outer member, from the no-load to the maximum load positions.

According to all forms of the present invention, with a given clearance between the inner and outer members, the sides of the inner member provide roller-engaging paths in one peripheral direction from the no-load position of the rollers that are as long as or longer than would be provided by an inner member of regular polygonal cross-section (having the same number of sides). At the same time, the radial distance from a side of the inner member to the directly opposite junction of two sides of the outer member is substantially increased to accommodate elastic cushioning elements of larger cross-sectional area than could be accommodated if the inner member were a regular polygon in transverse section.

The above and still other objects, advantages, and characteristic features of the invention will be more fully understood by reference to the following detailed description of illustrative embodiments of the invention, taken in conjunction with the accompanying drawing in which:

Figure 1 is an end view of a device embodying the basic improvements constituting the present invention, the corresponding relationship of parts if the device were designed according to my above mentioned prior application, Serial No. 232,306, being shown in phantom outline;

Fig. 2 is an end view of the device of Fig. 1 in substantially its fully loaded condition after the inner member has been rotated a full 45° in a clockwise direction relative to the outer member;

Fig. 3 is a perspective view, partly broken away, showing a modified form of the invention and including a torque arm or crank for applying torque to the inner member while the outer member remains fixed;

Fig. 4 is a similar perspective view of the device of Fig. 3 after a load has been applied;

Fig. 5 is a perspective view, partly broken away, showing another modified form of the invention;

Fig. 6 is a similar perspective view of the device of Fig. 5 after a load has been applied;

Figure 7:
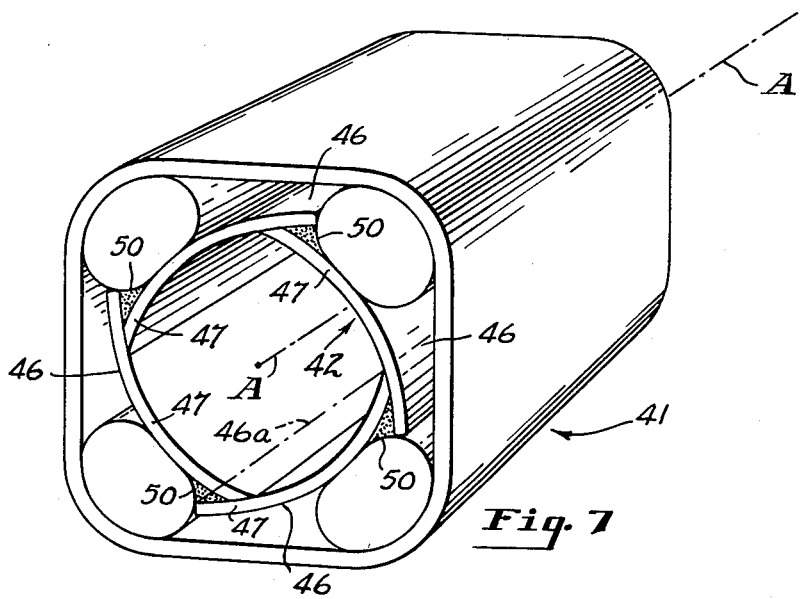
Fig. 7 is a perspective view showing still another modification of the invention in which each rolling surface of the inner member is curved (as viewed in transverse section or end profile) over substantially its full width.

What is perhaps the simplest form of the present invention has been illustrated in Fig. 1 for simplicity and clarity in explaining the principles of the invention. As shown therein, the device may comprise an outer tubular member 1 and an inner member 2, both being generally square in cross section, except for protuberances extending longitudinally along the junctures of the sides of the inner member 2. The outer member 1 may have the longitudinal juncture of its sides rounded as shown at 3 to provide four, arcuately shaped pockets 4 for receiving a corresponding number of elastic cushioning elements 6 of rubber or the like.

The outer and inner members 1 and 2 may be of any desired axial length (not shown) and are preferably substantially concentric with each other and mounted for relative coaxial rotation. In the no-load condition of the device shown in Fig. 1, the flat sides 7 of the inner member are disposed opposite and face toward the rounded apices of the outer member for substantially closing the pockets 4 and holding the cushioning elements 6 therein.

The cushioning elements or rollers 6 are preferably in the form of round rods and may be made of vulcanized natural or synthetic rubber, or any other elastic material having similar properties. By reason of the deformability of the cushioning elements, it is not absolutely essential that they be round in transverse section. Cushioning elements that are oval, roughly triangular, or otherwise out of round in transverse section when unstressed may be employed. Such shapes will retain substantially the same rolling relationship with the inner and outer members when distorted and displaced under load. However, since the cushioning elements may gradually slip or creep around their own axes, it is obvious that a consistent and smooth load-deflection curve will not generally be obtained unless the cushioning elements are substantially circular in transverse section. Also, any very substantial departure from circular transverse sections for the cushioning elements may, as these elements slip about their own axes over a period of time, prevent complete return of the elements to their original, no-load positions.

The cushioning elements are preferably of such a diameter that they must be radially compressed somewhat in order to be fitted into the pocket 4 between the outer and inner members 1 and 2. Though circular in cross section when unstressed, before being inserted into the device, the cross-sectional shape of the cushioning elements is distorted during the process of inserting them so that they are deformed, for example, to substantially the shape shown in Fig. 1 of the drawing.

The outer periphery of the inner member 2 (shown in this view as a solid member for simplicity) substantially corresponds to a regular, four-sided polygon or square in transverse section having rib-like protuberances 8 at the corners or apices of the polygon. These protuberances provide surface extensions 9 that project outwardly beyond the perimeter of the substantially closed polygonal outline defined by the four flat side portions 7. The surface extensions 9 formed by the protuberances 8 respectively serve as continuations of the flat sides 7. In this embodiment of the invention, the surface extensions 9 are coplanar with the flat side portions 7. Thus, each side 7 and its surface extension 9 may be viewed as extending tangentially with respect to a radius $r$ and extend all in the same tangential or peripheral direction with respect to the common axis of the inner and outer members. The outer edges of the protuberances 8 terminate sufficiently short of a circle C, inscribed in the outer member 1 and tangent to the four flat inner surfaces of the outer member, for the inner member 2 to rotate continuously within the outer member if the cushions 6 were removed. Thus, the inner member is capable of rotation relative to the outer member without interference by contact of the protuberances 8 with the inner surface of the outer member.

When a load is applied to the device of Fig. 1 in such a manner as to rotate the inner member 2 relative to the outer member 1 in the direction indicated by the arrow in Fig. 1, the cushioning elements 6 roll along the flat sides of the outer and inner members without appreciable friction, while being compressed therebetween, and approach the condition shown in Fig. 2 in which the outer and inner members have been relatively rotated through an angle of 45°. This degree of relative rotation is substantially the maximum for which the device is designed in normal use, though it is apparent from Fig. 2 that additional relative rotation is possible in the event of an overload without any likelihood of "rolling over" or any tendency for the ends of the protuberances 8 to engage and gouge the cushioning elements 6.

For purposes of comparison with the devices of my above mentioned prior application, the size and shape of the inner member desirably employed in accordance with the invention of that prior application and the size and shape of the cushioning elements that would be employed therewith are indicated in phantom outline in Fig. 1, these parts being respectively designated 2a and 6a. It is apparent from Fig. 1 that the modified form of inner member 2 employed in accordance with the present invention accommodates substantially larger cushioning elements 6 and at the same time lengthens the roller-engaging surfaces of the inner member in the direction in which the cushioning elements roll thereon. As will be apparent from this comparison, the present invention increases the angle through which the inner and outer members may safely rotate in normal use and also increases the torque resisting capacity of the devices for a given angle of rotation, as a result of the greater size of the cushioning elements, without increasing the overall dimensions of the device, i. e., the dimensions of the outer member.

When a torque has been applied to a device of this character and is then suddenly released, the device obviously has recoil or rebound characteristics that cause relative rotation of the outer and inner members in the reverse direction beyond the normal no-load condition. Also, in many applications of devices of this character, it is desirable that the devices provide relatively high, but yieldable, resistance to reverse deflections from the no-load position, as for the purposes of resisting a normally constant reverse torque. In the no-load position illustrated in Fig. 1, reverse surface extensions 10 on the protuberances 8 are curved so as to lie substantially in engagement with the cushioning elements 6 over a substantial portion of the length of the reverse surface extensions. This produces an initial resistance to reverse (counterclockwise) deflection and a rate of increase of resistance to reverse deflection far greater than in the case of normal (clockwise) deflection.

Referring now to the embodiment of the invention shown in Figs. 3 and 4, the configuration of the protuberances 18 on the inner member 12 has been changed from the form shown in Figs. 1 and 2. In this case the protuberances 18 provide surface extensions 19 for the flat sides 17 of the inner member that are curved slightly outwardly in one peripheral direction, and provide similar surface extensions 20 in the opposite peripheral direction.

As indicated in the drawing, a crank or lever arm 21 may be rigidly connected to one end of the inner member 12 for applying torque thereto by means of a force F. Obviously similar load applying cranks may be applied to both ends of the inner member to obtain more uniform loading. Where one or more cranks 21 are applied to the inner member for this purpose, it is contemplated that the outer member 11 will be held in any suitable manner against rotation. It is also obvious that crank arms may be applied to the outer member 11 for applying a torque thereto while restraining the inner member 12 in any suitable manner against rotation. Also, when a torque is applied either to the inner member or to the outer member through a crank arm or the like, suitable bearings will generally be desired to maintain the original concentricity of the inner and outer members. For simplicity and clarity, however, such details and variations of the structures shown in Figs. 3 and 4 have been omitted, and a portion of the crank arm 21 is shown broken away. Obviously, these details are equally applicable to all forms of the present invention.

When torque is applied to the device of Figs. 3 and 4 through the crank arm 21, in a clockwise direction as viewed in the drawing, to rotate the inner member 12 through an angle α, the device functions in substantially the same manner as the device of Figs. 1 and 2, except that the curved surface extensions 19 more quickly engage the cushioning elements 16 and thereupon tend to compress the cushioning elements at a more rapid rate than the flat surface extension 9 in the device of Figs. 1 and 2. This results in a more rapid increase in the resistance to deflection for each additional increment of deflection as the load limit of the device is approached. Also, it decreases the tendency of the inner member to "roll over" when subjected to an overload. Since the torque-deflection characteristics of the device as the normal load limit is approached are affected by the contour of the curved surface extensions 19, such contour may be varied as desired for controlling this relationship.

As in the device of Figs. 1 and 2, the protuberances 18 in Figs. 3 and 4 provide reverse surface extensions 20 which correspond in function to their counterparts in Figs. 1 and 2.

Referring now to the embodiment of the invention illustrated in Figs. 5 and 6, the principles of the devices of Figs. 1 and 2 have been applied in still another manner. In the device of Figs. 5 and 6, the surface extensions 39, that correspond generally in function to the surface extensions 9 and 19 of the other embodiments of the invention, are curved slightly inwardly, instead of outwardly as in Figs. 3 and 4. This again increases the maximum safe deflection of the device in normal use, as in the devices of Figs. 1–4, while minimizing or slightly reducing the ratio of torque to deflection in the position of maximum load illustrated in Fig. 6. This may be accomplished while retaining reverse surface extensions 40 corresponding generally in curvature and function to the reverse surface extensions 10 and 20 in the devices of Figs. 1–4.

Referring now to Fig. 7, a structurally modified inner member 42 having roller-engaging surfaces 46 is shown as being constructed of four identical metal plates 47. The plates 47 are arranged in engagement one with another to form a hollow tubular structure coaxially disposed within a tubular outer member 41. The common axis of relative rotation is designated A in the drawing. Each of the four plates is welded to the two adjacent plates to hold the assembly together, the weld metal preferably being deposited as shown in the drawing to form reverse surface extensions 50, corresponding in function to the reverse surface extensions 10, 20, and 40 in Figs. 1–6.

In this particular embodiment of the invention, the metal plates 47 are convexly cambered over their full width with a substantially uniform curvature, as indicated in one instance by the dot-dash line 46a. The purpose of the curvature of the plates 47 is to counteract to a desired degree the normal progressive increase in the rate at which resistance to deflection increases with each additional increment of deflection when the sides of the inner member are flat, as in Figs. 1 and 2.

In all other respects, the relationship of parts, mode of operation, and advantages of the device shown in Fig. 7 are the same as in the devices of Figs. 1-6.

Figure 8:
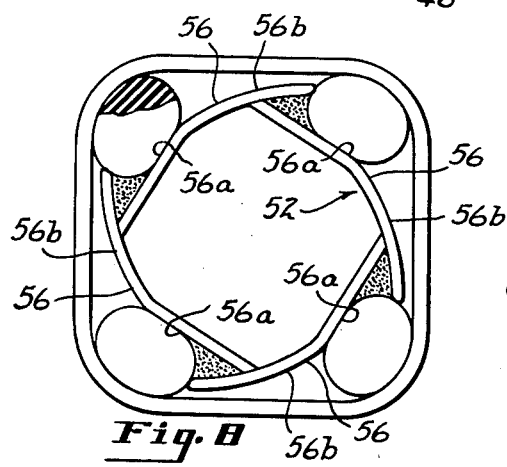
Figs. 8, 9, and 10 are end views of structures similar to Fig. 7 and showing three other modifications of the profile of the inner member.
Figure 9:
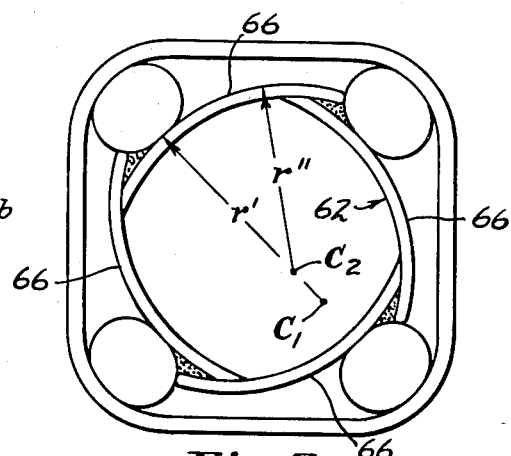
Figure 10:
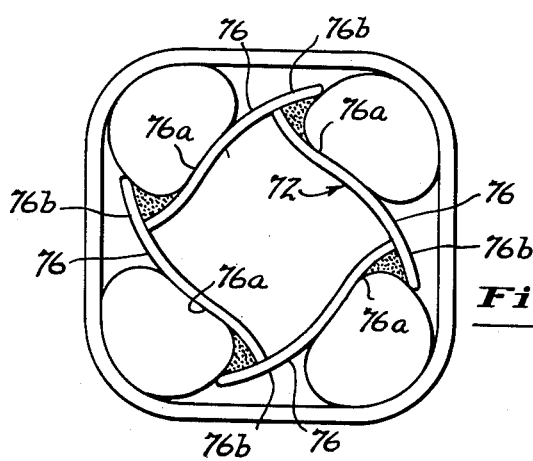

Figs. 8-10 show three additional shapes of inner members 52, 62, and 72, generally constructed like the inner member 42 of Fig. 7 but having differently shaped roller-engaging surfaces 56, 66, and 76. In Fig. 8, portions 56a of the roller-engaging surfaces 56 are flat, while portions 56b are convexly cambered.

In Fig. 9, the other roller engaging surfaces 66 have a varying curvature that increases in the direction in which the cushioning elements roll as load is applied. This is indicated in Fig. 9 by the two different radii of curvature $r'$, and $r''$ having respective centers $C_1$ and $C_2$. By properly varying the curvature in this manner, the ratio of applied torque to deflection may be kept substantially constant over the entire range of permissible loading of the device.

In Fig. 10, the roller-engaging surfaces 76 have concavely cambered portions 76a and convexly cambered portions 76b. This reflex curvature provides an initial rapid increase in the torque-deflection ratio during inital loading, followed by a substantially constant torque-deflection ratio as the load is increased to the permissible maximum, or a more nearly constant ratio than is produced by the flat roller-engaging surfaces of the device of Figs. 1 and 2.

As indicated above, the shape of the roller-engaging surfaces of the inner members may be selected according to the torque-deflection characteristics desired for any particular use. While a variety of shapes have been shown and described for illustrative purposes, it will be undrstood that the invention is not limited to these particular shapes. It will also be understood that the detailed structural features and the shapes and proportions of the parts in the several illustrative embodiments of the invention can be combined with each other in a variety of ways, and are not restricted to use in combination with the particular features with which they are associated in any particular figure or figures of the drawing.

This application is a continuation in part of my prior applications Serial No. 232,306, filed June 19, 1951, for Elastic Joints (referred to above), Serial No. 311,886, filed September 27, 1952, for Resilient Devices Having Deformable Cushions, and Serial No. 432,558, filed May 26, 1954, for Torsion Spring Device. In general, the present application is a refiling of the combined disclosures of the last two of said applications (subsequently abandoned) and is based in part upon a Swiss application filed October 23, 1951, the benefit of the filing date of said Swiss application being claimed herein.

From the foregoing description of several embodiments of the invention, it will be appreciated that the invention, in a very simple manner, increases the safe angle of relative rotation of the inner and outer members under normal operating conditions and decrease the possibility of damaging the cushioning elements as a result of the application of overloads, all without increasing the over-all size of the device or materially altering the basic character or mode of operation. It will also be appreciated that the invention provides a simple and effective means for resisting reverse loads and the recoil that results from rapid removal of a normal load.

While specific forms of the invention have been shown and described for purpose of illustration, it will also be apparent to those skilled in the art that the invention is not limited to these particular details, which may be varied considerably without departing from the scope of the invention as defined in the appended claims.

Having described my invention, I claim:

1. In an elastic device of the type having an outer tubular member, an inner member substantially coaxially disposed within the outer member with sufficient clearance for relative rotation of one member with respect to the other about their common axis, and a plurality of elastic cushioning rollers disposed between the interior of the outer member and the exterior of the inner member in substantially uniformly spaced relationship about the inner member, said cushioning rollers being free of connection with said members for rolling engagement therewith, the inner profile of said outer member in a transverse plane being substantially a square and providing four substantially flat, roller-engaging surfaces having axially extending junctions, the outer profile of said inner member in a transverse plane having four roller-engaging sides normally disposed opposite and facing generally toward said junctions, respectively, there being four of said cushioning rollers and one being normally disposed against each of said junctions and confined between two of said roller-engaging surfaces of said outer member and one of said roller-engaging sides of said inner member, the improvement in which said roller-engaging sides of the inner member, in transverse section, substantially define a regular, closed, four-sided figure having protuberances at its four corners, said protuberances respectively providing roller-engaging extensions of the sides of the inner member beyond the sides of said four-sided figure in the same peripheral direction with respect to said common axis, whereby a longer roller-engaging path is provided in said peripheral direction than is provided by an inner member which is square in transverse section, without such protuberances, and which has the same minimum clearance with said outer member when rotated relative thereto about said common axis.

2. The improvement of claim 1 in which a portion of each roller-engaging surface of said inner member is outwardly concave in transverse section adjacent one edge only thereof, said rollers being normally disposed in engagement with said outwardly concave portions for rolling movement along and beyond said concave portions during relative rotation of the inner member in one direction relative to the outer member.

3. The improvement of claim 1 in which each roller-engaging surface of said inner member is reflexly curved in transverse section to provide an outwardly concave and an outwardly convex portion.

4. The improvement of claim 1 in which a portion of each roller-engaging surface of said inner member is outwardly concave in transverse section adjacent one edge thereof and outwardly convex in transverse section adjacent the other edge thereof, said rollers being normally disposed in engagement with said outwardly concave portions for rolling movement along said concave portions and thereafter along said convex portions during relative rotation of the inner member in one direction relative to the outer member.

5. The improvement of claim 1 in which a portion of each roller-engaging surface of said inner member is curved in transverse section with non-uniform radii of curvature.

6. The improvement of claim 1 in which a portion of each roller-engaging surface of said inner member is curved in transverse section with progressively decreasing radii of curvature in the direction of rolling of said rollers during normal loading.

7. The improvement of claim 1 in which each roller engaging surface of said inner member in transverse section, has a flat portion normally in engagement with one of said rollers and a convexly curved portion beyond said flat portion in the direction of rolling of said rollers during normal loading.

8. The improvement of claim 1 in which each roller engaging surface of said inner member in transverse section, has a flat portion normally in engagement with one of said rollers and a concavely curved portion beyond said flat portion in the direction of rolling of said rollers during normal loading.

9. The improvement of claim 1 in which four plates form the major portions of the roller-engaging surfaces of said inner member, one axially extending edge of each of said plates overlapping and extending beyond the opposite edge portion of a next adjacent plate, and said plates being rigidly connected one to another to form a unitary inner member.

10. In an elastic device of the type having an outer tubular member, an inner member substantially coaxially disposed within the outer member with sufficient clearance for relative rotation of one member with respect to the other about their common axis, and a plurality of elastic cushioning rollers disposed between the interior of the outer member and the exterior of the inner member in substantially uniformly spaced relationship about the inner member, said cushioning rollers being free of connection with said members for rolling engagement therewith, the inner profile of said outer member in a transverse plane being substantially a square and providing four substantially flat, roller-engaging surfaces having axially extending junctions, the outer profile of said inner member in a transverse plane having four substantially flat, roller-engaging sides normally disposed opposite and facing toward said junctions, respectively, there being four of said cushioning rollers and one being normally disposed against each of said junctions and confined between two of said roller-engaging surfaces of said outer member and one of said roller-engaging sides of said inner member, whereby rotation of one of said members with respect to the other about their common axis will impart rolling movement to said cushioning rollers along confining flat sides of both of said members while radially compressing said cushioning rollers therebetween, the improvement in which said roller-engaging sides of the inner member, in transverse section, substantially define a regular, closed, four-sided figure having protuberances at its four corners, said protuberances respectively providing roller-engaging extensions of the sides of the inner member beyond the sides of said four-sided figure in the same peripheral direction with respect to said common axis, whereby a longer roller-engaging path is provided in said peripheral direction than is provided by an inner member which is square in transverse section, without such protuberances, and which has the same minimum clearance with said outer member when rotated relative thereto about said common axis.

11. The improvement of claim 10 in which the roller-engaging extensions of the flat sides of said inner member are coplanar with said flat sides, respectively.

12. The improvement of claim 10 in which the roller-engaging extensions of the flat sides of said inner member are outwardly convex in transverse section.

13. The improvement of claim 10 in which the roller-engaging extensions of the flat sides of said inner member are outwardly concave in transverse section adjacent said flat sides.

References Cited in the file of this patent

UNITED STATES PATENTS

| 1,590,055 | Porter | June 22, 1926 |
| 2,388,450 | Thompson | Nov. 6, 1945 |

FOREIGN PATENTS

| 671,653 | Great Britain | May 7, 1952 |